July 3, 1956
R. E. BARNABY ET AL
2,753,173
TURN RATE MEASURING INSTRUMENT
Filed Sept. 17, 1952
4 Sheets-Sheet 1
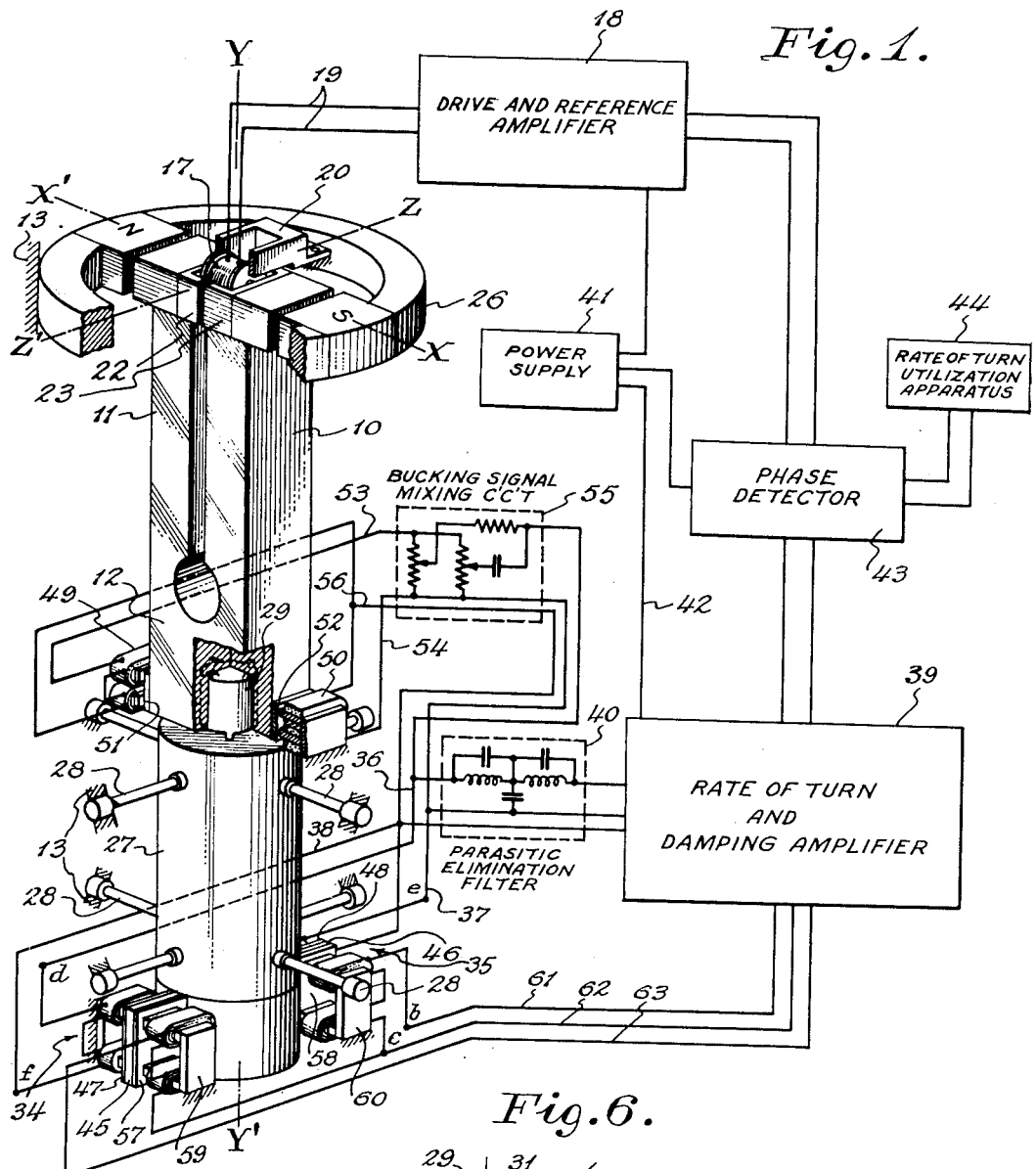
Fig.1.
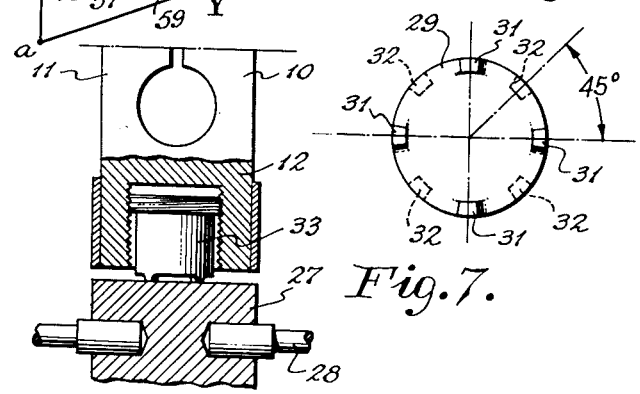
Fig.6.
Fig.7.
INVENTORS
ROLAND E. BARNABY
CHARLES T. MORROW
BY
Arthur H. Serrell
ATTORNEY

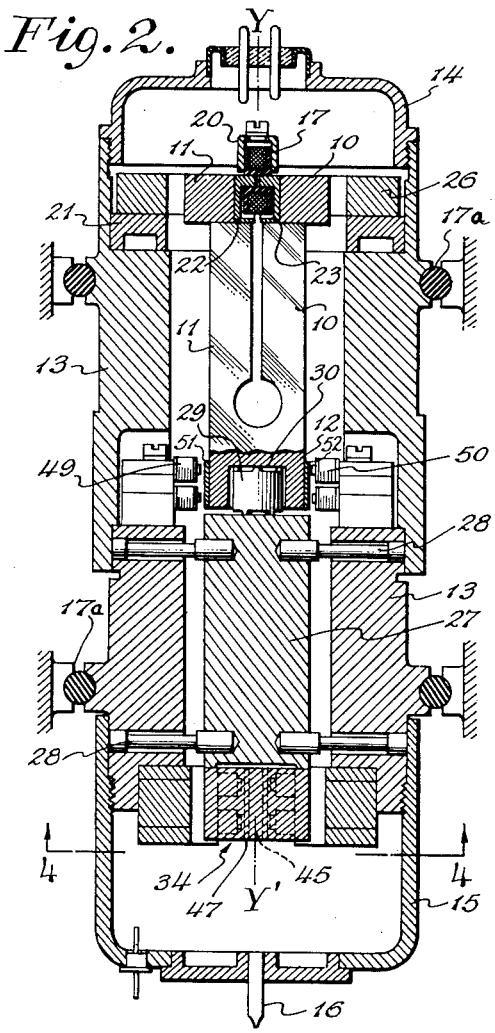

July 3, 1956  R. E. BARNABY ET AL  2,753,173
TURN RATE MEASURING INSTRUMENT
Filed Sept. 17, 1952  4 Sheets-Sheet 3

INVENTORS
ROLAND E. BARNABY
CHARLES T. MORROW
BY
Arthur H. Serrell
ATTORNEY

United States Patent Office 2,753,173
Patented July 3, 1956

2,753,173

TURN RATE MEASURING INSTRUMENT

Roland E. Barnaby, Garden City, N. Y., and Charles T. Morrow, Pacific Palisades, Calif., assignors to Sperry Rand Corporation, a corporation of Delaware Application September 17, 1952, Serial No. 310,094

11 Claims. (Cl. 264—1)

This invention relates to an instrument that provides a measure of the turn rate of a body or craft about an axis. More specifically, the invention relates to an angular velocity responsive device of the type shown and described in U. S. Patent 2,513,340, issued July 4, 1950, to Joseph Lyman, which discloses an electrically oscillated tuning fork, a mounting for the fork resiliently coupling the fork to a rigid member fixed to the body or craft, and a measuring means connected to the fork in the form of an electrical pick-off providing a signal output corresponding in amplitude and phase to the magnitude and sense of the angular displacement between the vibrating fork and the rigid member of the device that is fixed to the body or craft.

The present invention also relates to an improvement in the structural characteristics of a device of the particular type shown and described in U. S. Patent 2,683,596, issued July 13, 1954 in the names of Lloyd A. Nevala and the present inventors.

One of the objects of the invention is to further enhance the operational characteristics of the device pertaining to its ruggedness, noise level, time response and stability.

One of the features of the present invention resides in the provision of an improved tine drive means for the fork in which magnetic pole pieces are incorporated as part of the tines of a non-magnetic fork.

Another feature of the invention is contained in an improved nodal mounting structure for the fork adapted to isolate the pick-off of the device from vibrations along the axis of symmetry of the fork caused by symmetrical mass unbalance of the tines or distortion in the heel of the fork due to bending of the tines as the same vibrate.

A further feature of the invention resides in the improved means provided for compensating the output of the device for torsional vibrations caused by unbalance of the tines about the axis of symmetry of the fork.

Other objects, features and structural details of the invention are hereafter set forth in the following description in connection with the accompanying drawings which show an illustrative form of our improved rate measuring instrument.

In the drawings,

Fig. 1 is a schematic perspective view showing the internal elements of an instrument embodying the present inventive concepts together with a wiring diagram of its components;

Fig. 2 is a complete detail vertical section of the device, as schematically shown in Fig. 1, along a plane coincident with the normal plane of vibration of the tines;

Fig. 3 is a view similar to Fig. 2, taken in a plane at right angles to the normal plane of vibration of the tines;

Fig. 4 is a section view taken on lines 4—4, Fig. 2;

Fig. 5 is a section view taken on lines 5—5, Fig. 3;

Fig. 6 is a detail end view of the nodal coupling element shown in Figs. 1, 2 and 3;

Fig. 7 is a partial vertical section of the character shown in Fig. 2 in which a modified form of nodal coupling element is illustrated;

Figure 8:
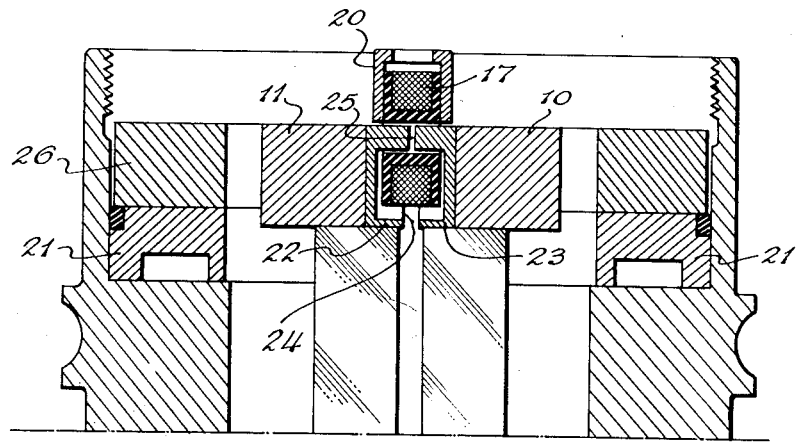
Fig. 8 is an enlarged elevation view, partly in section of the tine drive means of the device.

With particular reference to Figs. 1, 2 and 3, the improved device shown includes a tuning fork whose tines 10 and 11 are adapted to normally vibrate in a plane defined by the axes XX', YY'. The axis of symmetry of the fork is designated by the noted axis YY'. The pair of tines 10 and 11 of the tuning fork are resiliently connected by a heel portion designated at 12. A mounting is provided for the oscillating fork of the instrument that includes a rigid housing member 13, Figs. 2 and 3. As shown, member 13 is tubular in form and includes top and bottom closing caps 14 and 15 that are suitably connected thereto. In the finished instrument, the connections between the parts of the housing member are hermetically sealed and the housing is evacuated by way of tube 16. The housing for the instrument thus provides an airtight enclosure for the fork and other operating parts thereof. As shown in Figs. 2 and 3, the rigid housing member is fixed to the body or craft whose turn rate is to be measured through suitable shock absorbing rings 17a. The arrangement of the instrument on the craft is such that the axis YY' of the device is situated in coincident or parallel relation to the axis of the craft or body for which the information provided by the instrument is desired. It will be understood the rigid housing member 13 of the instrument moves with the body or craft as movement occurs about the axis YY' of the instrument.

Figure 11:
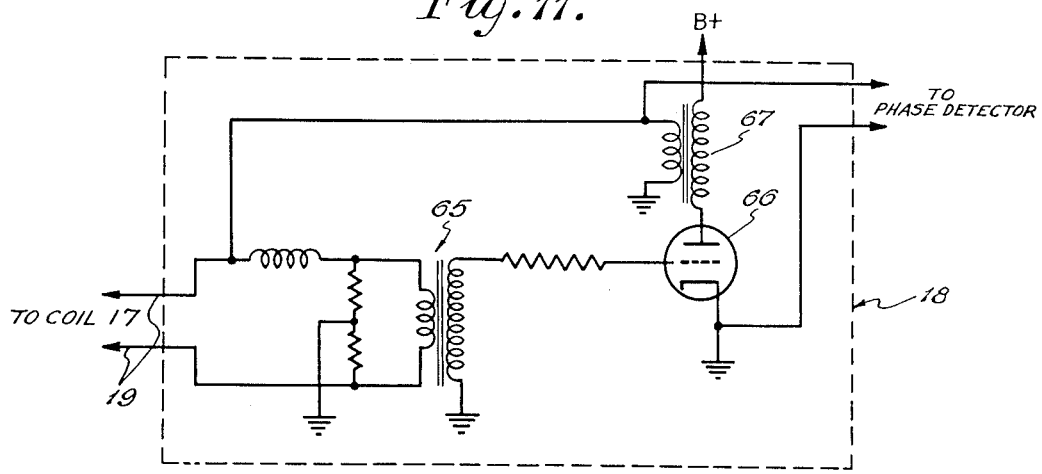
Fig. 11 is a circuit diagram showing the elements and connections of the part of the instrument designated in Fig. 1 as the drive and reference amplifier.

The need for a complex adjusting structure for accurately positioning the coils of the tine driving means, as provided in the above noted Patent No. 2,683,596 has been obviated in the improved instrument. In accordance with the present invention, as shown in Figs. 1, 2, 3 and 8, the tines 10, 11 of the non-magnetic tuning fork are oscillated at a frequency corresponding to its natural vibration frequency by a tine drive means which includes a coil 17 that is energized by pulsating or alternating current electrical energy from a drive and reference amplifier 18 by way of leads 19. With reference to Fig. 11, the voltage in input transformer 65 is proportional to the amplitude of the tuning fork. This voltage is amplified by vacuum tube 66 and drives the output transformer 67. The output of transformer 67 is returned to the drive coil 17 in proper phase relationship to sustain the fork's oscillation and is the reference output that is fed the phase detector 43. As particularly shown in Figs. 3 and 5, the coil 17 is fixedly mounted on the rigid housing member 13 of the device by means of a bracket 20 and a connecting disc 21 that is suitably secured to the inner wall of member 13. The coil is so located within the housing member 13 that its axis is in the plane XX', YY' of tine vibration and perpendicular to the axis YY' of symmetry of the tuning fork.

Figure 9:
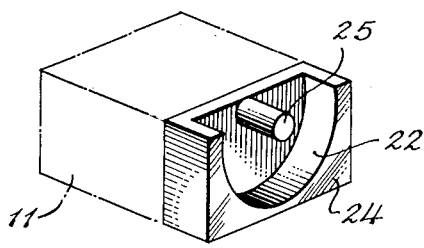
Fig. 9 is a detail perspective view of one of the pole pieces of the tine drive means.

The improved electromagnetic drive means for the tines further includes a variable reluctance circuit having a pole piece fixed to each of the tines. Each of the pole pieces consists of two pole faces that are arranged in opposing spaced relation to provide two gaps of unequal length. The pole pieces indicated at 22 and 23 may be fixed to the respective tines 11 and 10 in a brazing operation or otherwise connected thereto. As shown in Figs. 8 and 9, the pieces 22 and 23 are constructed and arranged so that the area of the closest of the opposing pole faces is smaller than the area of the other pole faces. The pole face area of the widest spaced pole faces is larger than the pole face area of the other pole faces. The larger of the pole face areas is indicated at 24 in Fig. 9. The smaller of the pole face areas is indicated at 25. The two opposing pole face areas 25 as shown in Fig. 8 are closer than the two opposing pole face areas 24. A permanent magnet 26 or other suitable means is arranged on the member 13 to polarize the pole pieces of the variable reluctance circuit. As shown, magnet 26 is suitably fixed within the member 13 with its field parallel to the axis of the coil 17, the arrangement being such as to force magnetic flux through the gaps of the variable reluctance circuit in parallel. The coil 17 is suspended about one of the gaps of the variable reluctance circuit without touching the tines of the fork in order to produce an alternating flux which passes through the two gaps in series. In the construction shown, the coil 17 is about the gap between the nearest of opposing pole faces. The tine drive operates by virtue of the fact that the two gaps are of unequal length and areas as defined by the pole faces so that although the two alternating fluxes are the same, the two polarizing flux densities are different. Although the forces developed from tine to tine in the two gaps oppose each other, the force developed for the larger of the gaps is practically negligible. In the improved device, the drive forces are from tine to tine rather than from tine to housing. This is due to the fact that the alternating current flux path is localized in the work tine pole pieces and consequently the force between the tines is likewise localized and independent of the housing. The polarized flux emanating from the permanent magnet structure located on the disc 21 which is a part of the external housing experiences negligible change in level due to alternating flux effecting the drive of the tines and accordingly substantially all of the drive forces are localized in the pole piece structure of the tines.

As shown, the tuning fork and tine drive means are located at the top end of the housing member 13. The lower end of the housing member 13 includes the output measuring means or torsion pick-off, the damping means, and the mounting structure interconnecting the tuning fork and housing member 13.

The mounting structure for the fork of the device further includes an intermediate rigid member in the form of a torsion shaft 27. Member 27 is symmetrical relative to the axis YY' of the fork and extends along the fork axis which corresponds with the torsion axis of the device. As shown, the members 13 and 27 are resiliently coupled by a plurality of spokes 28 directed radially of the fork axis and fixedly connected at the respective ends thereof to the respective members. Four of such spokes interconnect the top of the torsion shaft and member 13 and four of such spokes interconnect the lower portion of the shaft and member 13. The spokes supporting the shaft 27 produce a torsion resonance at fork frequency but no other resonance near the fork frequency.

In accordance with the present invention, we have provided a device responsive to turning movements of a body or craft about an axis which has extreme ruggedness and long-term stability. For perfect stability, i. e., no drift in the absence of turning movement, it is theoretically sufficient to have the torsional mounting members of the fork completely free from all vibration at fork frequency except that due to the turning movement. In practice, however, it is extremely difficult to isolate the tuning fork mounting completely from all undesired vibrations. However, by means of a nodal coupling and a torsional vibration compensator as hereinafter described, we have reduced the effect of the undesired vibrations to a minimum so that the device has an exceptionally low drift rate.

Figure 10:
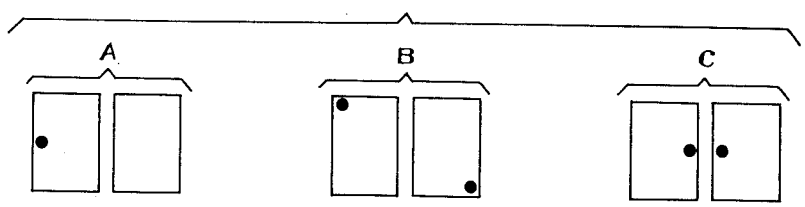
Fig. 10 is a schematic view showing the ends of the tuning fork of the device in three conditions of mass unbalance.

In devices of this character, one of the major causes of spurious or undesired vibrations arises from mass unbalance in the vibrating tines of the tuning fork. These undesired vibrations may produce direct or indirect spurious torsional vibrations about the sensitive axis or axis of symmetry YY' of the fork. With reference to Fig. 10, one of the primary spurious vibrations caused by mass unbalance of the tines may be a rocking or translational vibration parallel to the tine motion, in the plane defined by the axes XX', YY', caused by mass unbalance as illustratively represented by the dot in part A of Fig. 10. Another spurious vibration may be torsional in character. This vibration may occur about the axis YY' of symmetry of the fork and is caused by the type of mass unbalance represented by the dots in part B of Fig. 10. A third spurious vibration may occur along or parallel to axis YY' of symmetry of the fork. This is caused by the type of tine unbalance represented by the dots in part C of Fig. 10. Still a further type of spurious vibration which is directed along or radially of the axis YY' is that due to distortion in the heel 12 of the fork caused by bending of the tines during normal vibration.

The spoke structure described heretofore provides maximum structural rigidity along the XX', ZZ' axes and minimum compliance along the YY' axis. The constraint provided by the spoke structure about the YY' axis is such to provide a natural frequency the same as the fork frequency.

In accordance with the present invention, spurious vibrations of the axial type and that due to heel distortion of the fork are isolated by a coupling member or post 29. As shown in Figs. 1, 2 and 3, the heel of the tuning fork is provided with an axial recess or opening therein whose inside wall perpendicular to the axis of symmetry YY' of the fork is situated at a nodal plane in the fork, i. e., a plane in the heel of the fork that is subject to minimum distortion when the tuning fork is in vibration. The nodal plane is designated at 30 in Figs. 2 and 3. The rigid coupling member 29 as shown in detail in Fig. 6 may include a plurality of bosses or projections 31 spaced in equiangular relation about the axis of symmetry of the fork on the top surface thereof. The bottom surface may include a further series of symmetrically spaced bosses or projections 32. The bosses 31 of coupling member 29 are connected by a brazed joint to the nodal plane recessed portions of the heel of the fork. A similar joint connects the bosses 32 of the coupling member 29 with the rigid member or shaft 27 in a plane parallel to the nodal plane. As shown in Fig. 6, the bosses 31 and 32 in the respective parallel connecting planes are arranged in symmetrically spaced relation to one another.

A modified form of the nodal coupling structure described is shown in Fig. 7. In this arrangement the recess in the heel of the fork is screw threaded. The coupling member 33 is a plug similar to member 29 whose upper part is screw threaded to mesh with the threads in the heel. The parts are connected by a brazing operation at an approximate nodal plane in the heel portion of the fork defined by the top of the coupling member 33. The connection to the top of the shaft 27 of coupling member 33 is the same as that provided for coupling member 29. Both of the described nodal posts are substantially contained within the axial recess provided in the heel portion of the tuning fork. The nodal posts 29 and 33 are included as a portion of the mounting means for the tuning fork interconnecting the heel of the fork and the intermediate rigid member or shaft 27.

Figure 12:
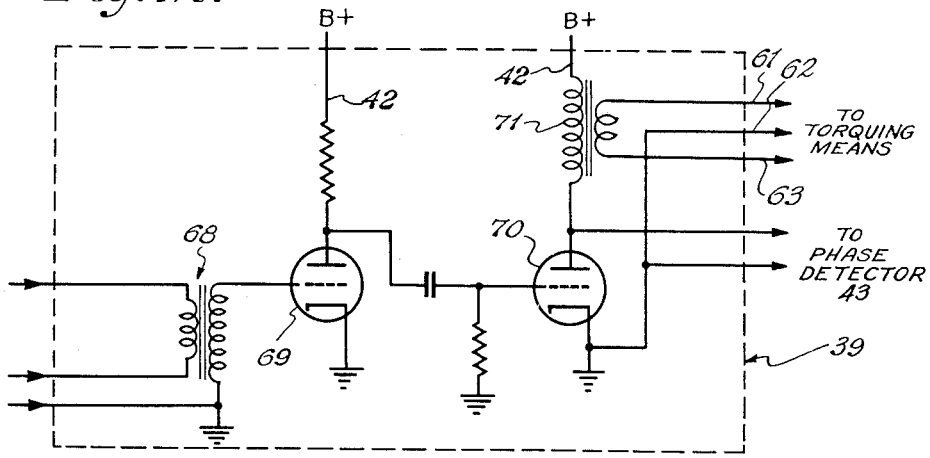
Fig. 12 is a view similar to Fig. 11 showing the components of the part of the instrument designated in Fig. 1 as the rate of turn and damping amplifier.

As explained in the Lyman Patent No. 2,513,340, as the tines 10 and 11 are rapidly vibrated in the plane defined by the axes XX', YY', and housing member 13 is moved about the axis YY', the tuning fork can preserve angular momentum only by executing a torsional vibration about the YY' axis proportional to the rate of the turning movement of the housing member. The magnitude and phase of this torsional vibration are expressed electrically by the torsion pick-off means indicated at 34 and 35 in Figs. 1, 2 and 3. The pick-off means 34 and 35 provide the rate measuring output of the device. As shown, the signal from the pick-off means 34, 35 is supplied by way of leads 36, 37 and 38 as one of the inputs to a rate of turn and damping amplifier 39 through a parasitic elimination filter 40. With reference to Fig. 12, the rate signal is applied to input transformer 68 and amplified by vacuum tubes 69 and 70. The output of tube 70 is fed to phase detector 43 and is further applied to output transformer 71. The output of transformer 71 is applied in proper phase relationship to the coils of a torquing means hereinafter described. Amplifier 39 is also connected to power supply unit 41 by way of lead 42. One of the outputs of the rate signal amplifier 39 may be applied to a phase-sensitive detector 43 in which it is compared with the reference signal from the drive and reference amplifier 18 to thereby obtain a resultant signal of phase and amplitude proportional to the rate of turning movement of the housing member 13 about axis YY'. The output of the phase detector 43 is connected to a suitable utilization apparatus 44 which may take the form of a meter that is calibrated to represent a measure of the rate of turn about axis YY' of the housing member 13. The utilization apparatus is controlled by the output of the device as provided by pick-off means 34, 35 and amplifier 39.

Figure 13:
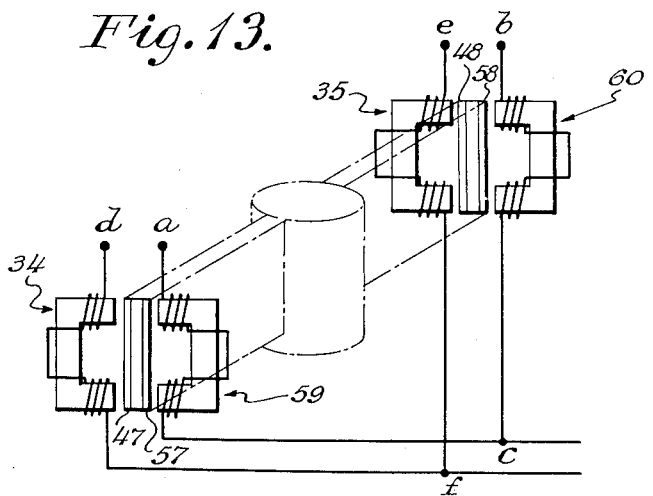
Fig. 13 is a wiring diagram showing the circuitry of the coils of the output pick-off and damping torque motor of the instrument.

The pick-off means 34 and 35 shown in Figs. 1 and 13 of the drawings are similar to the electromagnetic type of pick-off illustrated and described in Patent #2,683,596. The coils of the parts of the pick-off means are connected in series relation and provide a single output. The magnetic and coil element parts of the respective units forming the pick-off are fixedly mounted in the lower section of the rigid housing member 13, one of such magnet and coil elements being clearly shown in Fig. 1. The armature parts of the output providing device are fixedly mounted on respective oppositely disposed radial projections relative to axis YY' extending from a piece that is fixedly connected to the lower end of the intermediate rigid member or shaft 27. The radial projections or bosses on which the armatures are secured are indicated at 45 and 46. The armatures which are suitably fixed to the projections are indicated at 47 and 48. The spacing between the component armature and field elements of the respective parts of the pick-off means is uniform in the absence of torsional vibration of member 27. With vibration of member 27 about axis YY' due to the effect thereon of the sensitive element of the device or tuning fork, the pick-off means provides a corresponding electrical output proportional to the rate of turning movement of housing member 13 about axis YY'.

Spurious torsional vibrations such as due to unbalance of the tines of the type B in Fig. 10 are compensated for in the improved device by correcting the output of the device from the pick-off means 34, 35 by an electrical signal in accordance with the frequency and amplitude of tine vibration. Such a signal is obtained in the present instance by an additional pick-off means which may be of the character described to provide the output of the device. As shown in Figs. 1, 2 and 3, the magnet and coil parts 49, 50 are fixedly connected in opposite positions in the upper portion of the rigid housing member 13. The respective armature elements for the parts 49, 50 are fixedly connected to the heel portion of the respective tines 10, 11. These elements are respectively indicated at 51 and 52, the same being located in opposite relation on the outside lower surfaces of the respective tines. With the described pick-off means, an electrical signal is obtained that provides a measure of the frequency and amplitude of the tine vibration. This signal is fed to the filter 40 in opposition to the spurious output from the torsional pick-off means 34, 35 to affect the necessary compensation. As shown in Fig. 1, leads 53 and 54 from the frequency signal pick-off means connect with the filter input leads 36 and 37 by way of a bucking signal mixing circuit designated at 55. Common lead 56 from the frequency signal pick-off connects with common lead 38 of the pick-off means 34, 35.

After operation of the device with completion of the turning movement, the torsional vibration caused by the tuning fork should be brought to a stop in as short a time as possible. Such a damping operation should also occur at a predetermined rate. The damping means provided in the improved device is an electrical torque exerting means that is effective about the axis of symmetry of the tuning fork. The structure of the torquing means is the same as the pick-off means 34, 35, the same being electromagnetic and including two armature parts 57 and 58 and two magnetic flux conducting and coil parts 59 and 60 as particularly shown in Figs. 1, 4 and 13. These figures are related by the notations on the common leads at points $a$, $b$, $c$, $d$, $e$, and $f$. The wound core parts 59 and 60 of the structure are flux conducting, the same being fixedly mounted in the lower portion of the housing member 13. The armatures 57 and 58 are respectively fixedly connected to the radial projections 45 and 46 that form an integral part of the rigid intermediate member or torsion shaft 27. The coils of the torque motor are energized by way of leads 61, 62, 63 from the output of the rate of turn and damping amplifier 39 so that the device is properly damped.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a device for measuring the rate of turning movements of a craft about an axis, the combination of, a housing fixed to the craft, a tuning fork mounted in said housing having a pair of resiliently connected tines located to vibrate in a plane including said axis, electromagnetic means providing a tine to tine drive including a variable reluctance circuit having a pole piece fixed to each of the tines consisting of two pole faces arranged in opposing spaced relation to provide two gaps of unequal length, the area of the closest of the opposing pole faces being smaller than the area of the other of the pole faces, a permanent magnet fixed to said housing and arranged to polarize said circuit, and a coil energized by alternating current electrical energy fixed to said housing between the pole pieces with its axis in the plane of the vibration and normal to the axis of the craft.

2. A device for measuring the rate of turning movements of a craft about an axis including a housing fixed to the craft, a tuning fork located in said housing having a pair of resiliently connected tines adapted to vibrate in a plane including the axis, means for driving said tines, a mounting for the fork including an intermediate rigid member with symmetry about and extending along the axis resiliently coupled to said housing, electrical pick-off means about the axis providing a rate measuring output having a part fixed to said rigid member and a part fixed to said housing, means for compensating the device for torsional vibrations caused by tine unbalance including means for providing an electrical signal in accordance with the frequency of tine vibration, and means for correcting the output signal of said pick-off means by the signal of compensating means.

3. A device of the character claimed in claim 2, in which tine frequency signal means is provided by an electrical pick-off having a part fixed to the tines of the fork and a part fixed to the housing.

4. A device of the character claimed in claim 2, in which said mounting includes a coupling member between the fork and intermediate member connected at a nodal plane to the fork perpendicular to the axis.

5. In a device for measuring turn rates about an axis, a tuning fork having a pair of resiliently connected tines adapted to vibrate in a plane including the axis, a pick-off operated by said fork providing a rate measuring output signal, means for compensating the device for torsional vibrations caused by tine unbalance including a second pick-off operated by said fork providing a signal in accordance with the frequency and amplitude of the tine vibration, and means for combining the output signal of said first pick-off with the signal of said compensating means.

6. A device for measuring the rate of turning movements of a craft about an axis including a housing fixed to the craft, a tuning fork having a pair of resiliently connected tines located to vibrate in a plane including the axis, electromagnetic drive means for the tines including a pole piece fixed to each of the tines consisting of two pole faces arranged in opposing spaced relation to provide two gaps of unequal length, a coil energized by alternating current electrical energy fixed to the housing between the pole pieces with its axis in the plane of tine vibration and normal to the axis of the craft, a mounting for the fork including the housing, an intermediate rigid member with symmetry about and extending along the axis of the craft resiliently coupled to the housing, and a coupling member between said fork and intermediate member connected to the fork at a nodal plane perpendicular to the axis, electrical pick-off means about the axis providing a rate measuring output, means for compensating the device for torsional vibrations caused by tine unbalance including means for providing a signal in accordance with the frequency and amplitude of tine vibration, means for combining the output signal of said pick-off means with the signal of said compensating means, and means for damping the device including electrical means for exerting a torque about the axis in accordance with the compensated output signal.

7. In a device for measuring the rate of turning movements of a craft about an axis, the combination of, a housing fixed to the craft, a tuning fork mounted in said housing having a pair of resiliently connected tines located to vibrate in a plane including said axis, electromagnetic means providing a tine to tine drive including a magnetic pole piece fixed to each of the tines having two gap defining pole faces constructed and arranged in opposed relation to provide a variable reluctance circuit, means fixed to said housing arranged to polarize said circuit, and a coil energized by alternating current electrical energy fixed to said housing between the pole pieces with its axis in the plane of tine vibration and normal to the axis of the craft.

8. A device of the character claimed in claim 7, in which the mounting for the fork within the housing includes an intermediate rigid member with symmetry about and extending along the axis of the fork, means for resiliently coupling said member and housing comprising a plurality of spokes directed radially of the fork axis and fixedly connected at the respective ends thereof to the member and housing, and a coupling member between the fork and intermediate member connected within an axially recessed portion of the heel thereof at a nodal plane perpendicular to the axis of symmetry of the fork.

9. A device of the character claimed in claim 7, in which the fork includes a heel portion with a recess along its axis of symmetry, and the mounting for the fork within the housing includes a rigid coupling member connected to the heel of the fork within the axially recessed portion thereof at a nodal plane perpendicular to the axis of symmetry of the fork.

10. A device for measuring the rate of turning movements of a craft about an axis including a housing fixed to the craft, a tuning fork having a pair of resiliently connected tines located to vibrate in a plane including the axis, electromagnetic drive for the tines including a magnetic pole piece fixed to each of the tines having two gap defining pole faces constructed and arranged in opposed relation to provide a variable reluctance circuit, means for polarizing said variable reluctance circuit, a coil energized by alternating current electrical energy fixed to the housing between the pole pieces with its axis in the plane of tine vibration and normal to the axis of the craft, a mounting for the fork including the housing, an intermediate rigid member with symmetry about and extending along the axis of the craft resiliently coupled to the housing, a coupling member between said fork and intermediate member connected to the fork at a nodal plane perpendicular to the axis, electrical pick-off means about the axis providing a rate measuring output, means for compensating the device for torsional vibrations caused by tine unbalance including means for providing a signal in accordance with the frequency and amplitude of tine vibration, and means for combining the output signal of said pick-off means with the signal of said compensating means.

11. A device for measuring the rate of turning movements of a craft about an axis including a housing fixed to the craft, a tuning fork located in said housing having a pair of resiliently connected tines adapted to vibrate in a plane including the axis, means for driving said tines, a mounting for the fork including a rigid member resiliently connected to the housing, and a coupling member between the fork and rigid member connected within an axially recessed portion of the heel thereof at a nodal plane perpendicular to the axis of symmetry of the fork.

References Cited in the file of this patent

UNITED STATES PATENTS

| | | |
|---|---|---|
| 1,097,859 | Hecht | May 26, 1914 |
| 1,781,513 | Holweck | Nov. 11, 1930 |
| 2,266,449 | Ulhich et al. | Dec. 16, 1941 |
| 2,309,853 | Lyman et al. | Feb. 2, 1943 |
| 2,423,864 | Washburn et al. | July 15, 1947 |
| 2,455,939 | Meredith | Dec. 14, 1948 |
| 2,513,340 | Lyman | July 4, 1950 |
| 2,556,342 | Sebouh | June 12, 1951 |
| 2,594,749 | Ehrat et al. | Apr. 29, 1952 |
| 2,611,681 | Morrow | Nov. 4, 1952 |